United States Patent
Scannell et al.

(10) Patent No.: US 8,601,201 B2
(45) Date of Patent: Dec. 3, 2013

(54) MANAGING MEMORY ACROSS A NETWORK OF CLONED VIRTUAL MACHINES

(75) Inventors: Adin Scannell, Limehouse (CA); Timothy Smith, Toronto (CA); Vivek Lakshmanan, Toronto (CA); David Scannell, Toronto (CA); Kannan Vijayan, Toronto (CA); Jing Su, Toronto (CA)

(73) Assignee: Gridcentric Inc., Toronto (CA)

( * ) Notice: Subject to any disclaimer, the term of this patent is extended or adjusted under 35 U.S.C. 154(b) by 425 days.

(21) Appl. No.: 12/942,045

(22) Filed: Nov. 9, 2010

(65) Prior Publication Data

US 2012/0117298 A1    May 10, 2012

(51) Int. Cl.
*G06F 13/00* (2006.01)
*G06F 13/28* (2006.01)
*G06F 21/00* (2013.01)

(52) U.S. Cl.
USPC ......... 711/6; 711/159; 711/133; 711/E12.016

(58) Field of Classification Search
None
See application file for complete search history.

(56) References Cited

U.S. PATENT DOCUMENTS

| | | | |
|---|---|---|---|
| 6,789,156 B1 | 9/2004 | Waldspurger | |
| 7,757,034 B1 | 7/2010 | Dobrovolskiy et al. | |
| 8,151,263 B1 * | 4/2012 | Venkitachalam et al. | 718/1 |
| 2009/0300605 A1 * | 12/2009 | Edwards et al. | 718/1 |
| 2010/0088474 A1 | 4/2010 | Agesen | |
| 2012/0005401 A1 * | 1/2012 | Anand et al. | 711/6 |

OTHER PUBLICATIONS

H. Andres Lagar-Cavilla, Joseph Whitney, Adin Scannell, Stephen M. Rumble, Eyal de Lara, Michael Brudno, M. Satyanarayanan, "Impromptu Clusters for Near-Interactive Cloud-Based Services", Jun. 2008, Department of Computer Science, University of Toronto, Technical Report CSRG-TR578, http://sysweb.cs.toronto.edu/publication_files/82/csrg-578-snowfl.*
Haogang Chen, Yingwei Luo, Xiaolin Wang, Binbin Zhang, Yifeng Sun and Zhenlin Wang, "A Transparent Remote Paging Model for Virtual Machines", Jun. 2008, International Workshop on Virtualization Technology (IWVT in conjunction with ISCA'08), Beijing, http://www.cs.mtu.edu/~zlwang/papers/iwvt08.pdf.*
Horacio Andres Lagar Cavilla, et al., "SnowFlock: rapid virtual machine cloning for cloud computing", In EuroSys '09: Proceedings of the 4th ACM European conference on Computer Systems (2009), p. 1-12, Apr. 1-3, 2009.
Carl A. Waldspurger. 2002. Memory resource management in VMware ESX server. SIGOPS Oper. Syst. Rev. 36, SI (Dec. 2002), 181-194.
Paul Barham, et al., "Xen and the art of virtualization," SIGOPS Oper. Syst. Rev. 37, 5 (Oct. 2003), 164-177.

* cited by examiner

*Primary Examiner* — Eric S Cardwell
(74) *Attorney, Agent, or Firm* — DiBerardino McGovern IP Group LLC (57) ABSTRACT

A method and system manages memory in a network of virtual machines, including a copy of a master virtual machine (VM) memory system, the copy accessible to a memory server. The method includes determining whether a memory page requested by a clone VM memory system is fetchable from the memory server, the clone VM memory system hosted in a host memory system; if the memory page is fetchable from the memory server, fetching the memory page from the memory server; determining whether there is sufficient space in the host memory system to load the memory page; if there is insufficient space in the host memory system, evicting a selected memory page from the host memory system; and loading the memory page into the host memory system and the clone VM memory system.

20 Claims, 4 Drawing Sheets

MANAGING MEMORY ACROSS A NETWORK OF CLONED VIRTUAL MACHINES

TECHNICAL FIELD

The disclosed subject matter relates generally to the field of memory management in virtual machines, more specifically, to memory management in networks of virtual machines.

BACKGROUND

The efficient use of the costly physical resources of a computer or computer system has always been a priority in computer science. One technique for maximizing the use of the physical resources of a computer is multiplexing. Multiplexing conceptually means the doing of multiple tasks by interleaving them. For example, multiplexing the central processing unit (CPU) allows for much greater efficiency in CPU utilization and has been used since mainframe computing. The multiplexing of the CPU is handled by the operating system (OS) software running on the computer.

Virtualization is a technique in which a software component, typically known as a virtual machine monitor (VMM) or hypervisor, multiplexes the physical resources of a computer as virtual machines (VMs). A virtual machine (VM) is a software abstraction of an entire computer or all of the physical resources of a computer. An OS can run on the VM as if it were the entire computer. That is, the VM is provided by software running on the computer that is generally called a VMM or hypervisor. In contrast, with a single physical resource of a computer being multiplexed by an OS, now, an entire computer can be multiplexed by a VMM. The multiplexing of a computer by a VMM allows for the running of multiple guest OSs on corresponding multiple VMs. The computer on which a VM executes is generally called a host or host computer. The VMs each access a virtual address space that is not tied to the underlying physical memory of the host computer.

Oversubscription conceptually means that the sum of the allocated resources is greater than the actual resources available. Oversubscription and multiplexing are related concepts, and multiplexing may allow for oversubscription. For example, an OS generally runs on a computer, the computer can be oversubscribed by providing multiple VMs to run multiple guest OSs. The host computer is oversubscribed if the combined resource needs of the VMs exceed the physical resource capacity available to the host. Examples of these physical resources are processors, computing cores, memory, and storage capacity.

Memory oversubscription conceptually is a memory management technique that allows for the allocation of memory that is greater than the physical memory available. Generally, in virtualization, each VM has a fixed amount of virtualized memory, the sum of which is less than or equal to the total physical memory available on the host computer. The physical memory of the host is divided up into pages by the host memory system that the VMM can arbitrarily remap, which means that the VMs do not need contiguous memory. Generally, in a non-oversubscribed situation, there is an injective mapping from the virtualized memory of the VM to the pages of physical memory in the host computer.

Paging is conceptually the process by which one or more memory pages are swapped in and out of physical memory in a computer, or virtualized memory in a VM. The page that is swapped out may be written to local storage such as a swap partition or pagefile. The corresponding page table entry is marked as not present, and the page can be swapped in to memory as required. Operating systems have been paging out memory to disk for a long time. A person of ordinary skill in the art would understand that a request for a memory page means that the contents of the memory page are being requested, generally being identified by a page number. It is understood that memory pages can vary in size and memory page size is generally determined by the architecture of the physical CPU or CPUs on the host computer.

The Internet or networks of computers in general are formed from multiple computers connected by a communication network. In a network of VMs, multiple virtual machine monitors (VMMs) may cooperate over a communications network to more efficiently manage the guest OSs running on the VMs and the physical resources of the host computer. It is understood that the term server is used as an analogous term to computer, and is generally used to refer to a computer that is providing a particular service or services.

A network of VMs is made up of a master VM with a varying number of clone VMs, also referred to as replica VMs, where the clone VMs are running or hosted on a host computer. The master VM is the VM that defines the computing environment of the network of clone VMs. For example, the computing environment typically includes the base operating system, libraries, network configuration and storage devices. A clone VM is an independently functioning copy of a master VM. The master VM may cooperate with the clone VM, or the clone VM may run independently. Generally, clone VMs are created as required and destroyed when no longer required, this allows for the efficient use of the host's physical resources. It is understood that each host contains a VMM capable of supporting the cloning primitive, among the other general capabilities that a VMM provides, such as, creating a VM, destroying a VM, and managing the host's resources. See, for example, Horacio Andres Lagar Cavilla, et al., "SnowFlock: rapid virtual machine cloning for cloud computing", In EuroSys '09: Proceedings of the 4th ACM European conference on Computer Systems (2009), p. 1-12.

Before a clone VM is cloned from a master VM, a copy of the current state of the master VM's memory system is created. This immutable copy of the master VM memory system is created at the time after invocation of the cloning operation and before the creation of the clone VM begins on the clone VM host, because, it is from this copy that the clone VM is cloned from. Generally, only a subset of the copy of the master VM's memory system is initially communicated to the host of the clone VM during cloning. As the clone VM executes, it will make requests for memory pages in its virtualized memory system, generally the VMM will load the requested memory page but potentially the contents of the requested memory page was not transmitted to the host of the clone VM during the cloning operation. In this case, the VMM will fetch the requested memory page from a memory server, which has access to the copy of the master VM memory system, over the communication network and then load the fetched requested memory page for the clone VM.

SUMMARY

Provided is a method for managing memory in a network of virtual machines, including a copy of a master virtual machine (VM) memory system, the copy accessible to a memory server. The method includes determining whether a memory page requested by a clone VM memory system is fetchable from the memory server, the clone VM memory system hosted in a host memory system; if the memory page is fetchable from the memory server, fetching the memory page from the memory server; determining whether there is sufficient space in the host memory system to load the memory page; if there is insufficient space in the host memory system, evicting a selected memory page from the host memory system; and loading the memory page into the host memory system and the clone VM memory system.

In one embodiment, the step of determining whether a memory page requested by a clone VM memory system is fetchable from the memory server comprises, determining whether the memory page has been modified; if the memory page has not been modified, identifying the memory page as fetchable from the memory server; if the memory page has been modified, then: identifying the memory page as not fetchable from the memory server; and retrieving the memory page from an accessible storage device.

In another embodiment, the step of fetching the memory page from the memory server comprises, requesting the memory page from the memory server; and the memory server returning a copy of the contents of the memory page from the copy hosted at the memory server.

In a further embodiment, the step of evicting a selected memory page from the host memory system comprises, identifying a target clone VM memory system to choose the selected memory page from; identifying the selected memory page from the target clone VM memory system to evict; evicting the selected memory page from the target clone VM memory system; and releasing a corresponding memory page from the host memory system.

In yet another embodiment, the step of identifying the selected memory page from the target clone VM memory system to evict includes, identifying a candidate memory page for eviction; and identifying the candidate memory page as the selected memory page for eviction; wherein identifying a candidate memory page for eviction is a function of at least one of: activity status of the candidate memory page for eviction; and modification status of the candidate memory page for eviction.

The method, in another embodiment, further includes determining whether the selected memory page has been modified; and if the selected memory page has been modified, creating a copy of the selected memory page on an accessible storage device.

The method, in a further embodiment, includes running a process in the background, the process including: determining whether there is sufficient space in the host memory system to load the memory page; and if there is insufficient space in the host memory system, evicting a selected memory page from the host memory system.

Also provided is a virtual machine monitor memory management system that includes a master virtual machine (VM) with a master VM memory system hosted at a server computer; a memory server and a copy of the master VM memory system hosted at a memory server computer, the memory server responding to requests for a memory data from a virtual machine monitor (VMM); and a host computer with a host memory system and the VMM, hosting a clone VM and a clone VM memory system, the clone VM memory system requesting the memory data, the VMM fetching the memory data from the memory server, the VMM evicting a selected memory page from the host memory system, the VMM loading the memory data into the host computer memory system and the clone VM memory system.

The system, in an embodiment, further includes a communication network, the communication network providing communications between the server computer, the memory server computer and the host computer.

The system, in another embodiment, further includes a control stack, the control stack managing a policy for the virtual machine monitor memory management system.

Also provided is a computer program product having computer readable program code for performing a method for managing memory. The method includes determining whether a memory page requested by a clone VM memory system is fetchable from the memory server, the clone VM memory system hosted in a host memory system; if the memory page is fetchable from the memory server, fetching the memory page from the memory server; determining whether there is sufficient space in the host memory system to load the memory page; if there is insufficient space in the host memory system, evicting a selected memory page from the host memory system; and loading the memory page into the host memory system and the clone VM memory system.

The system and method enable efficient and concurrent running of multiple OSs on multiple VMs provided by a VMM without being limited by the physical resources of the underlying host computer. Moreover, the system and method enable efficient use of the physical memory of the host computer.

The described system and method improve the efficiency of memory utilization by allowing for oversubscription of the physical memory of the host computer in a network of VMs.

DETAILED DESCRIPTION

Described herein are a method and system for oversubscribing memory on a host for one or more clone virtual machines (VMs) in a network of VMs. An exemplary embodiment and various alternative embodiments are described in detail after two exemplary networks of VMs are described.

For clarity, the term virtual machine (VM) used herein is a software container that holds a complete operating environment comparable to that provided by a complete physical computer or host, the operating environment including at least an operating system, system libraries and application stack. Also, for clarity, the broader term load or loading is used instead of page or paging in order to remove the legacy association of fetching the contents of the memory page from only local storage. For further clarity, the term memory data is used as an analogous term to memory page and is meant to encompass a varying amount of memory related data or information.

Figure 1:
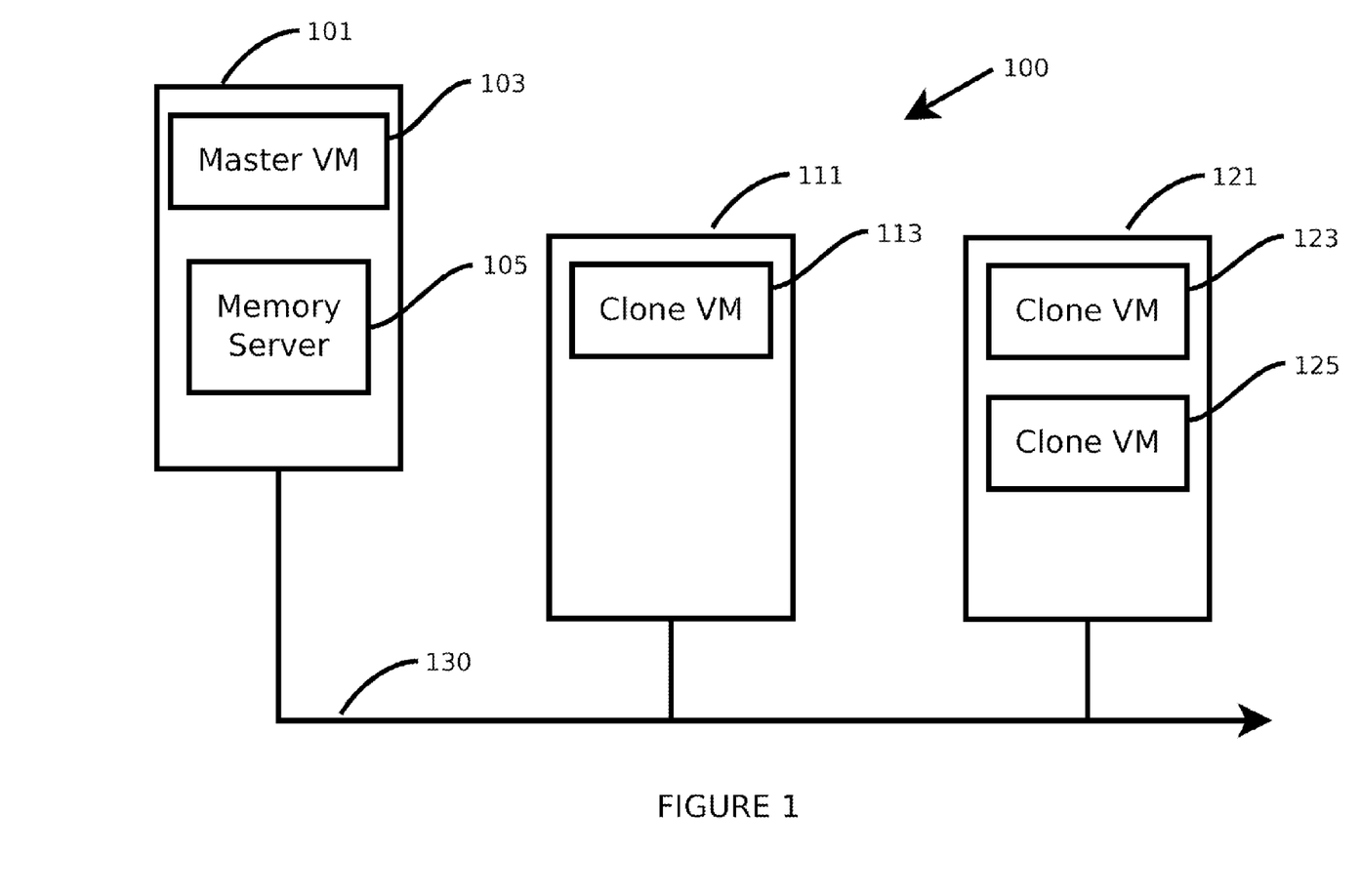
FIG. 1 is a block diagram of an example of a network of virtual machines.

Referring now to the attached figures, FIG. 1 depicts an exemplary configuration of a network of VMs 100 with a host 101, hosting a master VM 103 and a memory server 105, communicating with hosts 111 and 121 over the communication network 130. The master VM 103 and memory server 105 cooperate and can be used to create clone VMs, for example 113, 123, and 125, via a replication or cloning process. The hosts 101, 111 and 121 have memory systems hosting the virtualized memory systems of the clone VM memory systems. It is understood that memory systems include physical memory including cache memory, read-only memory (ROM) and random access memory (RAM), with the RAM component of the memory system being most relevant as it generally contains the program code and data relevant to the execution of the master VM or clone VM or both. Also, it is understood that memory systems are supported by various components of the OS, VM and VMM software.

Figure 2:
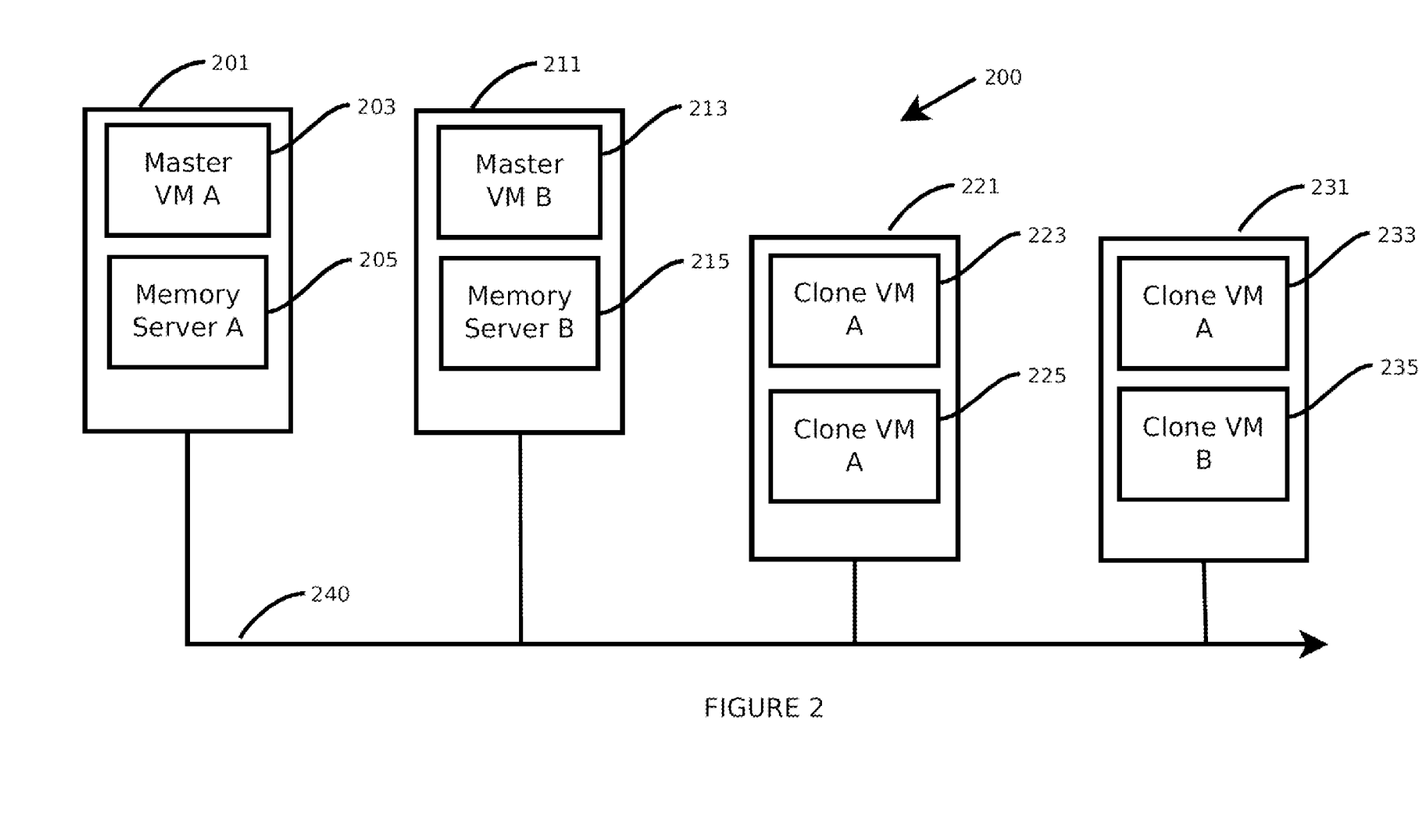
FIG. 2 is a block diagram of an alternative example of a network of virtual machines.

FIG. 2 illustrates an alternative example of a network of VMs 200 with clones of different master VMs running on the same host. There is shown a master VM A 203 and memory server A 205 on host 201, and a master VM B 213 with memory server B 215 on host 211. Host 221 has two clones 223 and 225 of master VM A running While host 231 has a clone 233 of master VM A and a clone 235 of master VM B running. It is understood that other permutations of clone VMs on a host or hosts are possible, where the clone VMs may be clones of the same master VM or of different master VMs. Additionally, multiple generations of the same master VM may be supported simultaneously, with multiple immutable copies of the master VM memory system and a memory server for each master VM generation. The generations of the master VM may arise when copies of the master VM memory system are made at different times, where a subsequent copy of the master VM memory system would have diverged from a previous copy of the master VM memory system. This is in addition to completely different master VMs, which those skilled in the art would understand as operating in an analogous manner.

Next, an embodiment and variants are described in detail. The example networks of VMs 100 and 200 shown respectively in FIG. 1 and FIG. 2 are used in the following detailed descriptions.

Figure 3:
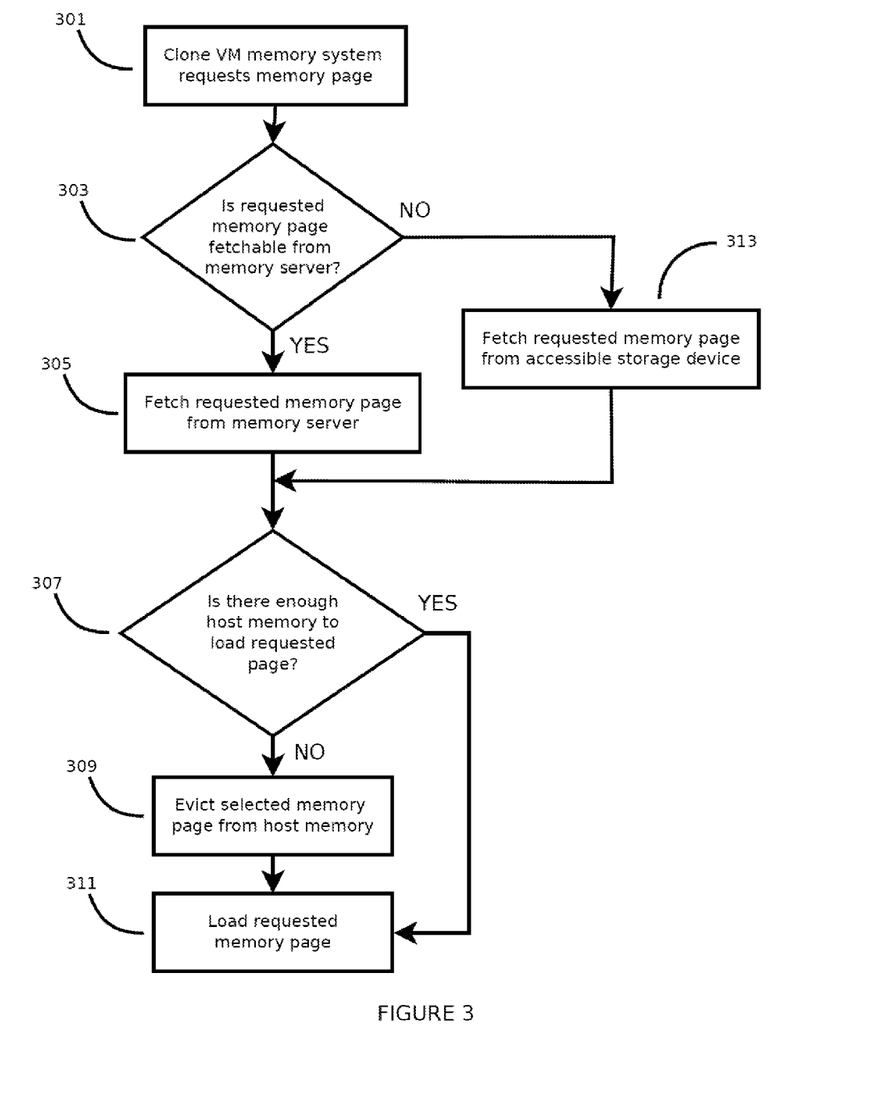
FIG. 3 is a flowchart of a procedure for memory oversubscription in a network of virtual machines.

FIG. 3 is a flowchart illustrating memory oversubscription operations according to one embodiment of the method for managing memory in a network of virtual machines, including a copy of a master virtual machine memory system, the copy accessible to a memory server. At step 301, a clone VM requests access to a memory page. For example, in FIG. 1, the memory system of clone VM 123 requests a memory page, where the clone VM memory system is hosted in the memory system of the corresponding host 121. When a clone VM requests access to a memory page, it may cause a page fault that will be handled by the VMM.

At step 303, the VMM determines if the requested memory page that caused the page fault is fetchable from the memory server over the communications network. The requested memory page is identified as fetchable from the memory server if it determined that the requested memory page has not been modified by the requesting clone VM. The VMM, at step 305, attempts to load the requested memory page by preferably fetching it from the memory server over the communications network because the communications network is generally faster than an accessible storage device, which is also referred to as a storage device accessible to the host computer. If the requested memory page is not fetchable from the memory server then, at step 313, the requested memory page is retrieved from an accessible storage device. There is no limitation as to which memory page can be fetched based on the contents of the memory page, nor does fetching the memory page from the memory server require inspection of the memory page contents.

In one embodiment, the VMM on the host computer maintains a memory-page-is-present bitmap for each clone VM running on the host. The memory-page-is-present bitmap allows the VMM to determine if a memory page needed by the clone VM is present in the host memory system and therefore does not need to be fetched from the memory server.

Additionally, for each clone VM, a memory-page-is-modified bitmap is also maintained, which is used to track the memory pages that have been modified by the clone VM memory system. When the contents of a memory page are fetched for a clone VM memory system, the corresponding bit in the memory-page-is-present bitmap is set, and the memory page is marked as read-only by the VMM. The first write access to the memory page by the clone VM memory system is trapped by the VMM, which then sets the corresponding bit for the memory page in the memory-page-is-modified bitmap. These two bitmaps provide sufficient information to determine whether a memory page requested by a clone VM memory system is fetchable from the memory server. For example, when a fetched memory page is evicted, the corresponding bit in the memory-page-is-fetched bitmap is cleared. When the evicted memory page is subsequently accessed by the clone VM memory system, the corresponding bit in the memory-page-is-fetched bitmap indicates that the memory page needs to be fetched, this can be coupled with the information in the memory-page-is-modified bitmap to determine whether the memory page can be fetched from the memory server. If the bit is not set in the memory-page-is-modified bitmap then the memory page can be fetched from the memory server. However, if the bit is set in the memory-page-is-modified bitmap then the memory page is retrieved from an accessible storage device. It is understood, that a bitmap refers to the linear address of the virtualized physical memory in a VM memory system, for example, a clone VM memory system. The VM memory system can be viewed as a linear array of page sized containers in which the contents of the memory pages are placed. The page sized containers are called page frames. For example, when the n-th bit in a bitmap for tracking whether a memory page is present is set, it means that the contents, which is referred to as a memory page in this document, of the n-th page frame was fetched or is present.

At step 305, a copy of the contents of the requested memory page is fetched from the memory server, if it was determined at step 303 that the requested memory page is fetchable from the memory server. For example, as illustrated in FIG. 1, the VMM on the same host 121 as the clone VM 123 requesting the requested memory page queries the memory server 105 for the requested memory page, and, the memory server 105 returns the contents of the requested memory page from the copy of the master VM memory system hosted at the memory server computer, which is preferably located on the same physical host 101 as the corresponding master VM 103. Alternatively, the request to the memory server may be in the form of a batch request for several requested memory pages required by a clone VM, or, it may be a batch request for memory pages by several clone VMs belonging to the same master VM or master VM generation. It is understood that although the memory server needs to have access to the corresponding copy of the master VM memory system as the clone VM making the request, the memory server and the corresponding copy of the master VM memory system could be located on another host separate from that of the master VM itself.

If it was determined at step 303 that the requested memory page is fetchable from the memory server, then the requested memory page does not need to be retrieved from an accessible storage device. Otherwise, at step 313, the VMM attempts to retrieve the requested memory page from an accessible storage device. A memory page would be stored on an accessible storage device if the memory page was previously requested, modified by a clone VM, and subsequently evicted at which point it would be written out to the accessible storage device. The modified memory page is stored on the accessible storage device because it has diverged from the copy of the master VM memory system that is accessible through the memory server. This storing of the modified memory page allows the clone VM to diverge in operation and state from the master VM, while minimizing the state, in the form of modified memory pages, that needs to be stored. An accessible storage device could be a local hard disk drive or local solid state drive, or a form of network storage, among other storage devices accessible to the host computer.

At step 307, a determination is made as to whether there is sufficient space in terms of free physical memory on the host computer for the VMM to load the requested memory page for the requesting clone VM. If it is determined that there is not enough free physical memory to load the requested memory page, whether fetched from the memory server or retrieved from an accessible storage device, then, at step 309, a selected memory page must be evicted from the host machine's physical memory. If there is enough free physical memory then the requested memory page is swapped in at step 311. It is understood that multiple memory pages may be selected for eviction in order to load multiple requested memory pages.

At step 309, a memory page is selected for eviction from the physical memory of the host machine of the requesting clone VM in order to load the fetched requested memory page. The details of the selection process for the selected memory page to be evicted are described below. It is worth noting that having a immutable copy of the master VM memory system at the point of clone VM replication available and knowing that requested memory pages can be fetched from the memory server when needed is what enables the VMM on the physical host to evict a selected memory page from a clone VM and release the corresponding memory page on the host memory system. In one embodiment, the immutable copy of the master VM memory system is created by identifying the memory pages as protected, immutable and copy-on-write.

In another embodiment, with steps analogous to steps 307 and 309, the steps of determining whether there is sufficient space in the host memory system to load the memory page, and, if there is insufficient space in the host memory system, evicting a selected memory page from the host memory system may be done in the background. In one embodiment, a process may operate in the background to identify selected memory pages and evict those selected memory pages as determined by a policy governing how many free memory pages or how much free physical memory is required. It is understood that a policy is an adjustable parameter, or set of parameters, that is generally adjusted to enable a specific configuration, level of performance, or quality of service.

Then, at step 311, the memory page requested by the clone VM memory system, whether fetched from the memory server or retrieved from the accessible storage device, is loaded in to the physical memory of the host memory system by the VMM, and is then loaded or made available to the requesting clone VM memory system.

Figure 4:
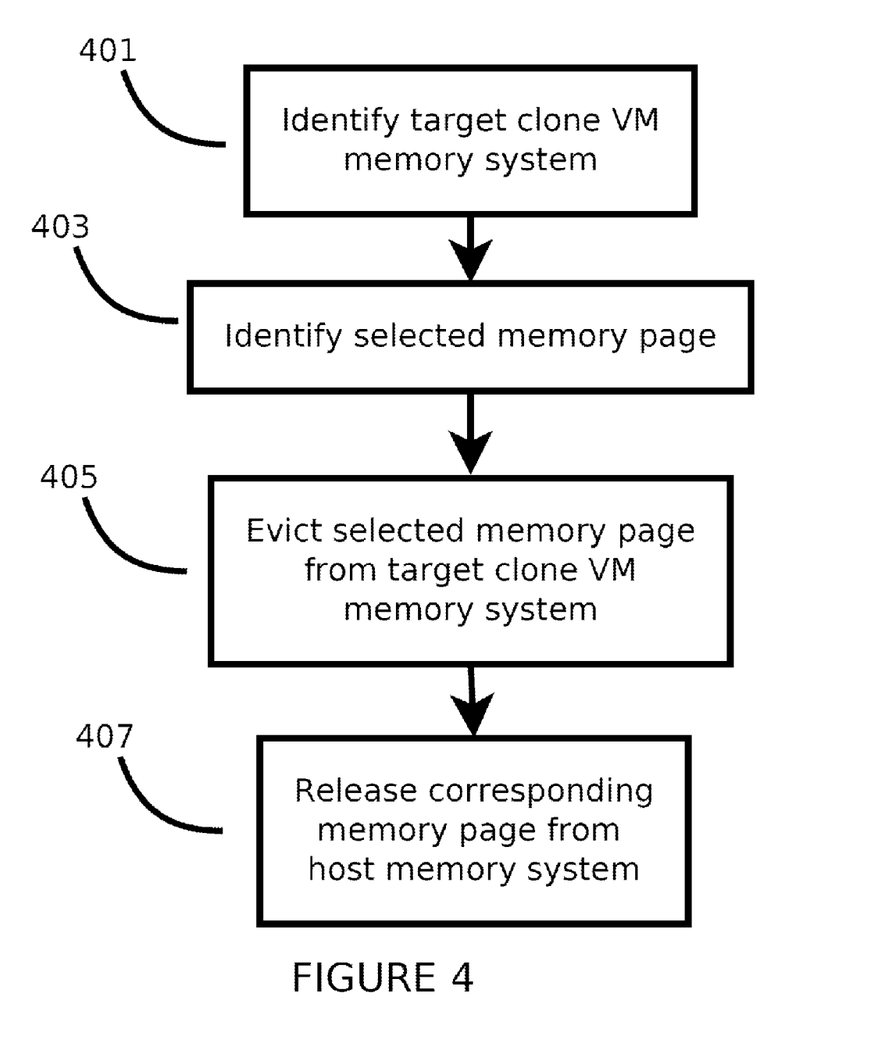
FIG. 4 is a flowchart of a procedure for selecting a memory page for eviction.

FIG. 4 is a flowchart illustrating the selection of a memory page for eviction. At step 401, a target clone VM is selected from among the clone VMs running on the physical host. It is understood that any clone VM running on the physical host is a potential candidate, and that there is no limitation on whether the clone VM selected is a clone of a specific master VM or master VM generation. Referring to FIG. 1, either clone VM 123 or clone VM 125 could be selected as a target clone VM on host 121. Referring to FIG. 2, either clone VM 233 or clone VM 234 could be selected as a target clone VM on host 231. In one embodiment, the selection of the target clone VM is done according to an adjustable policy. For example, the target VM clone selection policy may specify a random VM clone, a specific VM clone, or select a clone VM based on a measure of priority.

Then, at step 403, a selected memory page is a memory page selected from the target clone VM memory system for eviction. The selected memory page is selected based on a function of at least one of the activity status or the modification status of the candidate memory page. These selection criteria can depend on whether the memory page was marked as active or inactive, and, dirty or clean. Selecting an inactive page is preferable over an active page since it is relatively more efficient because an inactive page is not in use by any clone VM, and should have a lower probability of being requested again within a short period of time. Selecting a clean memory page over a dirty memory page would be relatively more efficient because when the page is evicted, the clean memory page would not have to be written out to an accessible storage device accessible to the host. For example, in one embodiment of identifying a selected memory page, preference could be given to selecting memory pages for eviction that were inactive regardless of whether they were clean or dirty, then active pages that were clean, and finally active pages that were dirty. Memory pages that are memory page tables are not considered candidates for eviction. It is understood that multiple memory pages may need to be selected for eviction in order to load multiple requested memory pages. Also, it is understood that a memory page is inactive if it is not referenced in any page table entry of the target clone VM memory system and the memory page itself is not a page table page.

At step 405, the selected memory page from the target VM is marked as unavailable to the target VM. If it is determined that the memory page selected for eviction has been modified or is dirty then it will be written out to the storage device accessible to the host at step 407. This is due to the reason that the selected memory page has been modified by the target clone VM and is different from the copy of the master VM memory system available through the memory server. If the memory page is active but clean then it can be evicted without saving a local copy, since when the evicted page is required again by a clone VM it can be fetched from the corresponding memory server. Finally, if the page is inactive, it can be silently dropped from memory since its contents are no longer useful.

At step 407, the selected memory page is released or evicted from the host memory system and the corresponding physical memory of the host is marked free.

In one embodiment, the control stack manages the policy of the virtual machine monitor memory management system. The policy of the system includes: determining on which computers master VMs are created, determining on which computers the clone VMs are created, collecting information on the current physical resource usage at each host computer. For example, information relating to free physical memory at each host may be collected by the control stack to assist in managing the other policies, or the control stack may specify which accessible storage device is to be used by a host if multiple accessible storage devices are available. It is understood that the policy of this embodiment of the system is varied and will encompass many different measurable and tunable parameters of the embodiments.

Although the above embodiments have been described in relation to multiple physical hosts with the master VM and memory server running on a separate physical host as the clone VM, there is nothing limiting the invention from operating on one physical host containing the master VM, memory server and clone VM.

The disclosure herein has been described with reference to specific exemplary embodiments, however, varying modifications thereof will be apparent to those skilled in the art without departing from the scope of the invention as defined by the appended claims.

What is claimed is:

1. A method for managing memory in a network of virtual machines (VMs), including a copy of a master VM memory system, the copy accessible to a memory server, the method comprising:
   determining by a virtual machine monitor (VMM) of a host machine whether a memory page requested by a clone VM memory system of a clone VM operating on the host machine is fetchable from the memory server, the clone VM memory system hosted in a host memory system of the host machine;
   fetching the memory page from the memory server when the memory page is determined to be fetchable from the memory server;
   determining by the VMM of the host machine whether there is sufficient space in the host memory system to load the memory page;
   evicting a memory page from a target clone VM memory system that is selected by the VMM from among one or more clone VMs running on the host memory system independent of any direction from the target clone VM, when space in the host memory system is determined to be insufficient; and
   loading the memory page into the host memory system and the clone VM memory system.

2. The method of claim 1, wherein determining whether a memory page requested by a clone VM memory system is fetchable from the memory server comprises:
   determining whether the memory page has been modified;
   identifying the memory page as fetchable from the memory server when the memory page has been determined to be unmodified; and
   when the memory page has been determined to have been modified, then:
      identifying the memory page as not fetchable from the memory server; and
      retrieving the memory page from an accessible storage device.

3. The method of claim 1, wherein fetching the memory page from the memory server comprises:
   requesting the memory page from the memory server; and
   receiving from the memory server a copy of the contents of the memory page from the copy hosted at the memory server.

4. The method of claim 1, wherein evicting a memory page from a target clone VM memory system comprises:
   identifying a target clone VM memory system;
   selecting the memory page from the identified target clone VM memory system;
   evicting the selected memory page from the identified target clone VM memory system; and
   releasing a corresponding memory page from the host memory system.

5. The method of claim 4, wherein selecting the memory page from the identified target clone VM memory system comprises:
   selecting a memory page as a function of at least one of:
      activity status of the candidate memory page for eviction; and
      modification status of the candidate memory page for eviction.

6. The method of claim 5, further comprising:
   determining whether the selected memory page has been modified; and
   creating a copy of the selected memory page on an accessible storage device when the selected memory page has been determined to have been modified.

7. The method of claim 1, further comprising:
   running a process in the background, the process comprising:
      determining whether there is sufficient space in the host memory system to load the memory page; and
      evicting a selected memory page from the host memory system when space in the host memory system is determined to be insufficient.

8. A virtual machine monitor memory management system, the system comprising:
   a master virtual machine (VM) including a master VM memory system hosted at a server computer;
   a memory server and a copy of the master VM memory system hosted at a memory server computer, the memory server configured to respond to requests for memory data from a virtual machine monitor (VMM); and
   a host computer including a host memory system and the VMM, the host computer hosting one or more clone VMs and clone VM memory systems, wherein in response to a request for memory data from a clone VM memory system, the VMM is configured to: fetch the requested memory data from the memory server, evict a memory page from a target clone VM memory system that is selected by the VMM from among the one or more clone VMs running on the host memory system independent of any direction from the target clone VM when space in the host memory system is determined by the VMM to be insufficient, load the memory data into the host computer memory system and the clone VM memory system.

9. The system of claim 8, further comprising a communication network, the communication network providing communications between the server computer, the memory server computer and the host computer.

10. The system of claim 9, further comprising a control stack, the control stack managing a policy for the virtual machine monitor memory management system.

11. A non-transitory computer program product having computer readable program code for performing a method for managing memory, the method comprising:
   determining by a virtual machine monitor (VMM) of a host machine whether a memory page requested by a clone virtual machine (VM) memory system of a clone VM operating on the host machine is fetchable from a memory server, the clone VM memory system hosted in a host memory system of the host machine;
   fetching the memory page from the memory server when the memory page is determined to be fetchable from the memory server;
   determining by the VMM of the host machine whether there is sufficient space in the host memory system to load the memory page;
   evicting a memory page from a target clone VM memory system that is selected by the VMM from among one or more clone VMs running on the host memory system independent of any direction from the target clone VM, when space in the host memory system is determined to be insufficient; and loading the memory page into the host memory system and the clone VM memory system.

12. The non-transitory computer program product of claim 11, wherein determining whether a memory page requested by a clone VM memory system is fetchable from the memory server comprises:
    determining whether the memory page has been modified;
    identifying the memory page as fetchable from the memory server when the memory page has been determined to be unmodified; and
    when the memory page has been determined to have been modified, then:
        identifying the memory page as not fetchable from the memory server; and
        retrieving the memory page from an accessible storage device.

13. The non-transitory computer program product of claim 11, wherein fetching the memory page from the memory server comprises:
    requesting the memory page from the memory server; and
    receiving from the memory server a copy of the contents of the memory page from the copy hosted at the memory server.

14. The non-transitory computer program product of claim 11, wherein evicting a memory page from a target clone VM memory system comprises:
    identifying a target clone VM memory system;
    selecting the memory page from the identified target clone VM memory system;
    evicting the selected memory page from the identified target clone VM memory system; and
    releasing a corresponding memory page from the host memory system.

15. The non-transitory computer program product of claim 14, wherein selecting the memory page from the identified target clone VM memory system comprises:
    selecting a memory page as a function of at least one of:
        activity status of the candidate memory page for eviction; and
        modification status of the candidate memory page for eviction.

16. The non-transitory computer program product of claim 15, wherein the computer readable program code for performing a method for managing memory further comprises:
    determining whether the selected memory page has been modified; and
    creating a copy of the selected memory page on an accessible storage device when the selected memory page has been determined to have been modified.

17. The non-transitory computer program product of claim 11, wherein the computer readable program code for performing a method for managing memory further comprises:
    running a process in the background, the process comprising:
        determining whether there is sufficient space in the host memory system to load the memory page; and
        evicting a selected memory page from the host memory system when space in the host memory system is determined to be insufficient.

18. A method for managing memory in a network of virtual machines (VMs), including a copy of a master VM memory system, the copy accessible to a memory server, the method comprising:
    determining by a virtual machine monitor (VMM) of a host machine whether a memory page requested by a clone VM memory system of a clone VM operating on the host machine is fetchable from the memory server, the clone VM memory system hosted in a host memory system of the host machine;
    fetching the memory page from the memory server when the memory page is determined to be fetchable from the memory server;
    determining by the VMM of the host machine whether there is sufficient space in the host memory system to load the memory page;
    selecting by the VMM of the host machine a target clone VM memory system from among one or more clone VMs operating on the host machine when space in the host memory system is determined to be insufficient;
    selecting a memory page from the target clone VM memory system by the VMM independent of any direction from the target clone VM;
    evicting by the VMM of the host machine the selected memory page; and
    loading by the VMM of the host machine the memory page into the host memory system and the clone VM memory system.

19. The method of claim 18 wherein selecting a target clone VM memory system from among the one or more clone VMs operating includes selecting the target clone VM system from among any clone VMs operating on host machine without limitation as to whether any clone VM is a clone of a specific master VM or master VM generation.

20. The method of claim 18 wherein selecting a target clone VM memory system from among the one or more clone VMs operating includes selecting the target clone VM system according to a policy for specifying the target clone VM that is adjustable to specify a random VM clone; a specific VM clone, or selection of a VM clone based on a measure of priority.

\* \* \* \* \*